Patented Jan. 5, 1932

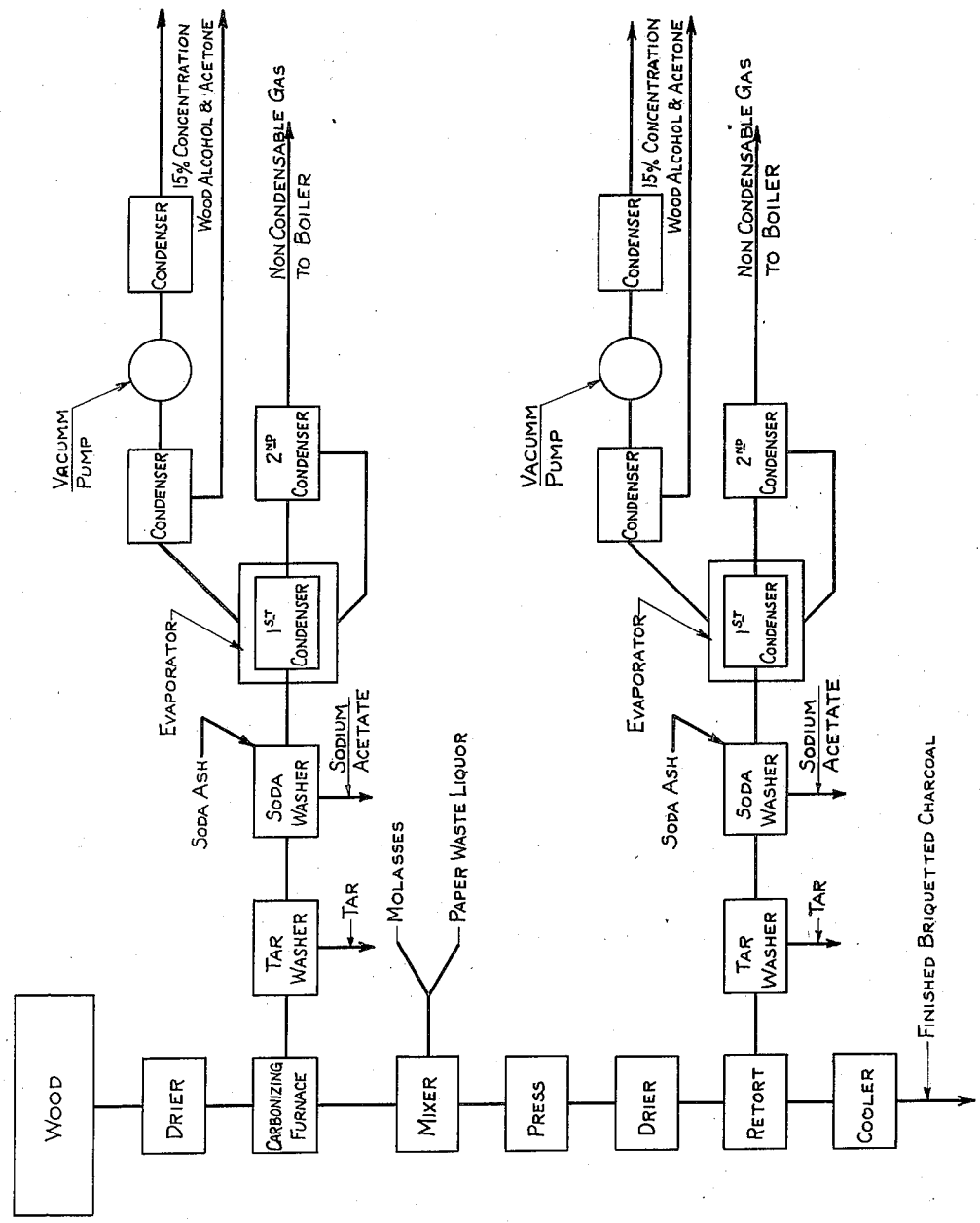

1,839,277

UNITED STATES PATENT OFFICE

ALFRED M. THOMSEN, OF SAN FRANCISCO, CALIFORNIA

RECOVERY OF PRODUCTS OBTAINED BY DISTILLATION OF WOOD

Application filed April 19, 1927. Serial No. 184,865.

This invention relates to improvements in the distillation of wood and especially in the method of recovering tar, acetic acid, wood alcohol etc.

My process refers to a new and useful improvement in the means of recovering tar, acetic acid, wood alcohol etc. from the gases produced when wood is distilled and more particularly to these gases when they are produced from some continuous mechanical charcoal furnace working on small waste of a woody nature such as sawdust, chips, fruit stones, sugar cane bagasse, tan bark, rice hulls, straw etc., in fact any substance which yields commercial chemical products and charcoal by destructive distillation.

The great difficulty in the way of profit making in these operations when conducted on any other substance than hardwood is the small yield of the volatile chemical products, which means that a very dilute wood vinegar results. Thus:—

(A) When wood is distilled in the ordinary manner, the water and volatile chemical content is usually evaporated three times, i. e., first in the retort, second in the tar still, and third in the making of acetate, the cost is too high for the small percentage of acetic acid produced.

(B) Furthermore, the gray acetate contains all the impurities that come over from the tar still which become fixed on neutralization, and when the liquor is weak in acetic acid this often means that gray acetate of commercial grade cannot be produced.

(C) The small amount of wood alcohol will not pay for distillation.

(D) The powdery charcoal produced is not salable.

I overcome these difficulties in the following manner, and will refer to the accompanying drawing which is a diagrammatic view or flow sheet showing the several steps of the process:

(A) The gases from the furnace whose temperature may vary from 212° to 1000° F. are thoroughly washed with a boiling solution of approximately 10% acetic acid whereby the tar is removed from the gases and the sensible heat above 212° F. (at sea level) is converted into latent heat of evaporation. Evaporation instead of condensation therefore results in this phase, and the tar free gases pass over into the next effect at 212° F., water or water containing acetic acid being added to make up the evaporation loss. By means of a settling tank the tar washed out may be recovered from the acid solution in the customary manner.

(B) The tar free gases from the last phase are now washed preferably with as highly a concentrated solution of sodium carbonate as possible and the acetic acid is fixed as sodium acetate. The temperature of the solution at sea level will be 212° F., and at higher elevations proportionately less. Potash may be substituted for soda if desired. Sufficient condensation is permitted in this phase to furnish the necessary water of crystallization for the acetate, or water may be added. In either case a hot saturated solution of acetate is obtained which requires only cooling to deposit a crop of crystals, the mother liquor being returned to the process. The acetate of soda is easily refined by suitable processes, gray acetate cannot be so refined save at prohibitive cost. Neither here nor in the preceding phase is any heat, save that inherent in the gases themselves required.

(C) The vapors from the second phase are now completely condensed, thus making a separation between the water, wood alcohol, acetone etc. and the permanent non-condensable gases. If this object were accomplished by means of a single condenser, the resultant liquid would be so dilute that rectification would be very costly if not prohibitive. I solve this difficulty as follows:

The condensation is carried out in two stages. In the first condenser the cooling jacket is connected to a vacuum pump which permits the cooling fluid to boil at less than atmospheric pressure. The second condenser is cooled by water as usual, and the cooling water should be as cold as the source of supply will permit. The condensate from both first and second condensers is employed as cooling water in the first condenser and the temperature regulated by means of the amount of vacuum employed. In this manner the heat inherent in the vapors escaping from the soda washer is again employed to distill the very dilute condensate, for by condensing the vapors in the vacuum circuit a concentrated product, approximately 15% or better wood alcohol and acetone is readily obtained. Material of such strength can bear the charge for further distillation in the orthodox manner. The temperature of the condensate or fluid in the jacket of the first condenser is such as is required to revolatilize all the alcohol and acetone contained therein, with as little water as compatable with the operation; this of necessity varies with the kind and condition of the wood employed. If the alcohol content is comparatively small, as when handling pine wood or the like, a lower vacuum and consequent higher temperature may be employed, and vice versa when the alcohol content is greater, as when handling hard woods, higher vacuums and lower temperatures are required.

(D) Powdered charcoal is an almost valueless commodity. Briquetting with starch paste, dextrin, tar, pitch etc. is an ancient remedy but introduces the difficulty that the product is on longer charcoal, but a mixture of charcoal and the binder.

I solve this difficulty by utilizing some cheap binding material, thus permitting a large quantity to be used and then subjecting the briquette to recarbonization whereby the binder is itself converted into charcoal. It follows that only a binder yielding a large percentage of charcoal on carbonization can be employed, and it must itself be a very low grade by-product of another industry or it will be too costly. The liquids particularly adaptable are beet and cane sugar molasses, and the cooking liquors of the paper industry, sulphite, sulphate, kraft, and soda liquors all being available. With cane molasses and waste sulphite liquor the briquettes will contain but little water soluble material. With the sulphate, kraft, and soda liquors the contained salts may be leached out of the charcoal or subsequently obtained from the ashes when the briquettes are burned. In this second carbonization these binders also produce valuable chemicals similar to the first mentioned series, and by the same means they may be commercially recovered as indicated by the flow sheet diagram.

Having thus described my invention, what I claim and desire to secure by Letters Patent is:—

1. A method of obtaining tar and sodium acetate from gases obtained by destructive distillation of materials yielding charcoal and acetic acid which consists in first washing the gases in a solution of approximately 10% acetic acid to remove the tar content, said solution being maintained at a temperature sufficiently high to prevent condensation of the gases, and secondly, washing the tar free gases with a solution of sodium carbonate maintained at full saturation strength by continuous addition of soda ash to fix the acetic acid content as sodium acetate and cooling the solution to deposit crystals of acetate of soda.

2. In the carbonization of wood or woody substances yielding charcoal and volatile chemicals, the recovery of tar, acetate of soda, wood alcohol and acetone which consists in first washing the gases with a boiling solution of approximately 10% acetic acid to liberate and permit removal of the tar, secondly, washing the tar free gases with a solution of sodium carbonate maintained at substantially full saturation strength by the continuous addition of soda ash to fix the acetic acid content as sodium acetate, removing the sodium acetate, condensing the remaining vapors and removing the non-condensable gases and finally subjecting the liquid obtained by condensation to a vacuum sufficiently low to permit the alcohol and acetone content to be boiled off and condensed.

3. In the carbonization of wood or woody substances yielding charcoal and volatile chemicals, the recovery of tar, acetate of soda, wood alcohol and acetone which consists in first washing the gases with a boiling solution of approximately 10% acetic acid to liberate and permit removal of the tar, secondly, washing the tar free gases with an alkaline solution maintained at substantially full saturation strength by the continuous addition of alkali to fix the acetic content as alkaline acetate, removing the alkaline acetate, condensing the remaining vapors and removing the non-condensable gases and finally subjecting the liquid obtained by condensation to a vacuum sufficiently low to permit the alcohol and acetone content to be boiled off and condensed, the heat necessary being furnished by the condensation of the last named vapors.

ALFRED M. THOMSEN.